Nov. 8, 1960

C. A. BUCHAN 2,959,109

FLY CUTTER TOOL

Filed Jan. 31, 1957

INVENTOR.
CLIFFORD A. BUCHAN
BY
Flournoy Corey
ATTORNEY.

2,959,109
FLY CUTTER TOOL

Clifford A. Buchan, 1611 Fremont, Marshalltown, Iowa

Filed Jan. 31, 1957, Ser. No. 637,411

3 Claims. (Cl. 90—11)

This invention relates to a fly cutter tool of the type which may be extended through a hole in a member or plate to spot face the underside thereof, and is more particularly concerned with a locking means for holding the fly cutter in operable position.

It is a primary object of my invention to provide a fly cutter tool in which the cutter blade is manually retractable and yet may be locked in a fixed position. It is still another object of my invention to provide a fly cutter tool in which the cutter blade, although pivotally mounted, will not be moved out of position by reason of forces exerted by the work piece.

It is yet still another object of my invention to provide a fly cutter tool in which a cutter blade can be locked in position or unlocked while the fly cutter is in motion.

It is still another object of my invention to provide a fly cutter tool which may be easily assembled and disassembled for quick repair and cleaning.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims without departing from the spirit of the invention.

Figure 1:
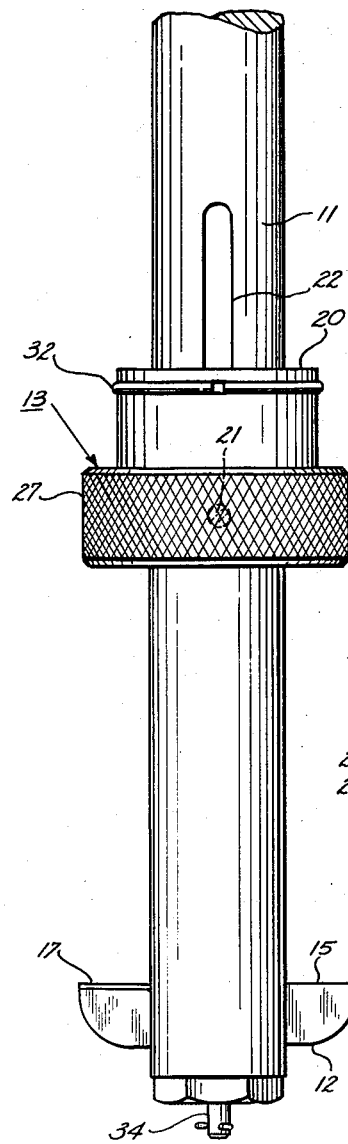
Figure 1 is a side view of a fly cutter constructed according to my invention, showing the cutting blade engaged to the work piece.
Figure 3:
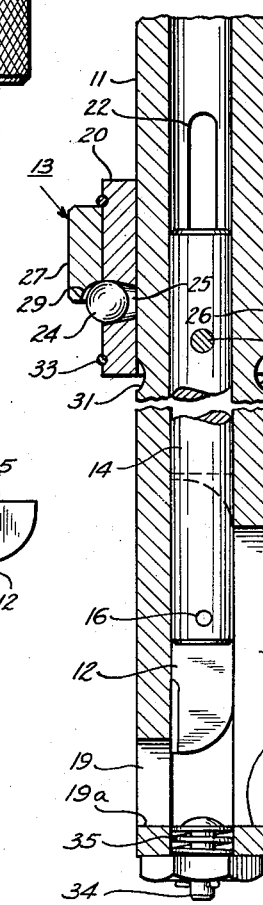
Figure 3 is a cross sectional view of the lock portion showing the locking mechanism in an open position.
Figure 2:
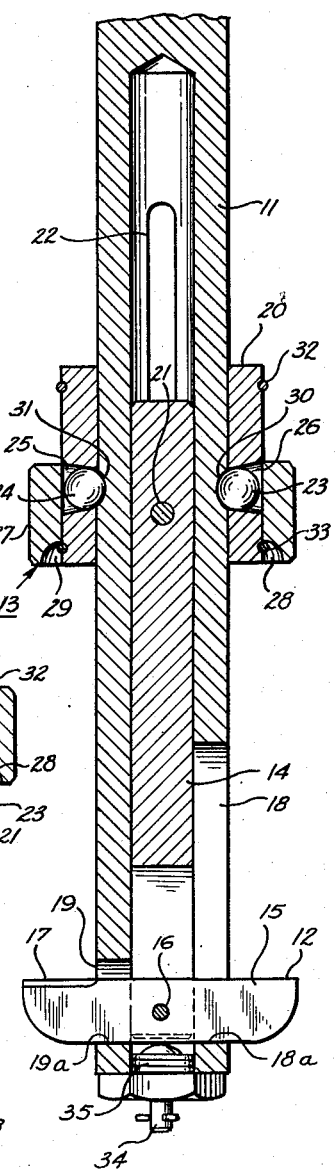
Figure 2 is a view in cross section showing the fly cutter of Figure 1.

Referring now to Figure 1; a fly cutter, constructed according to my invention comprises three main elements, the tubular housing 11, the cutter blade 12, and the locking ring assembly 13 with the inner arbor 14 fixedly attached thereto.

The cutter blade is pivotally mounted on the outer end of the arbor 14 by means of pin 16. This pin is positioned midway of the ends of the cutter blade, the two opposite faces 15 and 17 of the cutter blade extending outwardly through slots 18 and 19 in the tubular housing. These two slots are of unequal length. The arbor is slidable within the housing, and it will be apparent that by drawing the arbor upwardly, the cutter blade will be biased pivotally around the pin 16 as the arbor is moved to a point where the cutter blade will reach a position parallel to the direction of movement of the arbor, and thus it can be held entirely within the tubular housing.

Of course in operating the tool, this arbor is drawn upwardly until the blades are completely enclosed in the housing. Then the entire housing is inserted through an opening in the work piece until it reaches a point where these blades are on the opposite face of the work piece. When this has been accomplished, the arbor can then be moved downwardly and the blades will again be forced outwardly into a cutting position. When the entire assembly is pulled upwardly, the cutting edges of the blades will then be biased against the work piece and cause the removal of metal or the like from the underside of the work piece.

It will at once be apparent that since this cutter blade is pivotally mounted, if the underside of the work piece is not entirely level, that is if one side is slightly higher than the other, the blade in actual operation will be caused to rock and thereby will fail to accomplish the desired results. Accurate cutting of the face can only be achieved if the cutter blades are held rigidly in position after they are once extended, even though the work surface may be uneven.

To achieve the desired results, as set forth in the foregoing paragraph, I have provided a locking mechanism which is generally referred to at 13. This mechanism consists of a tubular barrel portion 20 which is fixed to the arbor by a threaded pin 21. This pin extends diametrically from the outer periphery of the barrel on one side to the outer periphery of the same barrel on the opposite side and is adapted to move vertically in relation to the housing with the arbor, a slot 22 being provided in the tubular housing for this purpose.

Also carried in this barrel member are two balls 23 and 24. These two balls are of substantially greater diameter than the thickness of the barrel member and are carried into circular openings 25 and 26 of the member 20.

Surrounding this barrel member is a knurled collar 27, having the lower face thereof recessed, as at 28 and 29, this recessed portion being provided to receive the previously mentioned balls 23 and 24 when the collar is above them on the barrel. This recessed surface extends around the entire circumference of the collar, the pin 21 terminating within the inner circumference of the collar to permit free vertical and rotary movement of the collar.

The outer walls of the tubular housing member 11 is provided with two opposed circular indentations 30 and 31 which are of such a size as to receive the balls 23 and 24 when they are brought in registry therewith.

Turning now to the operation of the device as previously set forth, it will be understood that the arbor slidably engaged in the tubular housing may be freely moved up and down as long as the barrel member is not locked in relation to the tubular housing. When the collar 27 is in its uppermost position in relation to the barrel member, the two balls are held outwardly by the housing itself and are received in the previously mentioned recess in the collar. As the collar is pushed downwardly, these two balls and the barrel member are likewise pushed down until the entire assembly reaches a point where the barrel holes containing the balls are in registry with the indentation of the housing. At that instance the two balls slip inwardly into the indentations and thereby clear the collar. The collar then slides the rest of the distance down the barrel, thus encompassing the two balls and holding them in position in relation to the tubular housing. This in turn of course locks the arbor and cutter blades in position.

Movement of the collar is ultimately limited by a pair of snap rings 32 and 33. The collar itself is mounted for free rotation. It is therefore possible for the operator of the tool to grasp the collar, even though the tool itself is being rotated, and thereby move it vertically in either direction to lock or unlock the arbor and cutter blade in relation to the housing.

It will be noted that the bottom ends of the slots 18 and 19 form a solid parallel surface at 18a and 19a.

The under portions of the cutter blade is also a flat surface which mate with these two surfaces 18a and 19a to hold the cutter blade rigidly in position. Since these two points and the pin 16 form a triangle, force exerted against one side of the cutter blade, as for example 17, will be firmly resisted and the blade will make a clean even cut regardless of irregularities in the work piece itself. To provide a cushion against the downward movement of the arbor and cutting blade, also to aid in directing the cutter blade outwardly, I have provided a loosely vertically movable pin 34 which is spring loaded at 35.

From the foregoing description, it will be apparent that I have provided a device in which the cutter blade may be firmly locked in position quickly and easily while the tool is in motion, and may be as easily released at the will of the operator.

Although I have described a specific embodiment of my invention, it is apparent that modifications may be made by those skilled in the art. Such modifications may be made without departing from the spirit and scope of my invention as set forth in the appended claims.

I claim as my invention:

1. In a fly cutter tool of the type described including a tubular housing having a pair of slots in the lower portion thereof and a second pair of longitudinal slots upwardly from the first mentioned slots, an arbor slidably mounted internally of said housing, extending for a substantial portion thereof and having a cutter blade pivotally mounted to register with the lowermost housing slots and adapted to be extended outwardly therethrough when said arbor is at its downwardlymost position, a barrel member mounted externally of said housing slidably thereon adjacent the uppermost slots therein, means extending horizontally through said arbor outwardly through said uppermost slots and engaging said barrel member terminating at the outer periphery of said barrel member, ball means positioned in said barrel member, said ball means being of greater diameter than the thickness of said barrel member, means in said housing to receive the innermost portion of said ball members, a collar rotatably, vertically and slidably positioned on the outer periphery of said barrel member, an annular circumferential groove internally positioned on the lowermost edge of said collar and adapted to receive the outermost portion of said ball members, whereby downward movement of said collar will be transferred to said barrel member through the medium of said balls until said balls are brought into alignment with the receiving means on said housing, thereby permitting them to move inwardly of said barrel member to further permit said collar means to be moved to its lowermost position on said barrel member, whereby a rigid fixed engagement will be secured between said barrel member, housing, and arbor when said arbor is in its lowermost position.

2. In a fly cutter tool, a tubular housing having a pair of unequal slots at the lowermost end thereof, said tubular housing further having a pair of equally coextensive slots positioned upwardly of the first mentioned slots, an arbor slidably mounted within said housing and having a cutter blade pivotally mounted on the lowermost end thereof positioned to be selectively extended through said lowermost housing slots, a barrel member positioned externally of said housing member adjacent the uppermost slots therein and slidably positioned thereon, pin means extending through said arbor outwardly through said uppermost housing slots and into said barrel member terminating in the outer periphery thereof to cause said arbor and said barrel member to be fixedly engaged relative one to the other, a pair of balls positioned in said barrel member, said balls being of slightly greater diameter than thickness of said barrel member, indentation means in said housing adapted to receive the innermost portion of said balls, said indentation means being positioned relative to the lowermost slots in said housing whereby they will receive said balls only when said arbor is in its lowermost position and when said pivotal cutter blade is extending outwardly through said unequal slots, a collar vertically and slidably positioned externally of and on said barrel member, said collar having a radially indented annular portion on the lowermost internal lip of said collar adapted to receive the outermost portion of said balls only when they are not engaged in the aforesaid housing indentations, ring means positioned on both the uppermost and lowermost portions of said barrel member whereby vertical movement of said surrounding collar will be limited thereto, the relative positioning of said collar, balls, barrel member, housing, arbor and pin means being such that only inherent radial forces will be transferred from said arbor to said barrel member through said pin means.

3. In a device as set forth in claim 2 including a spring-loaded pin positioned at the lowermost portion of said housing and extending upwardly of the lowermost portion of said unequal slots in the path of movement of said arbor and said flat cutting blade, said pin being rounded on the upper end thereof to cause said blade to be directed outwardly through said slot as it is moved downwardly against said pin, said pin further being vertically slidable to a limited extent and having a spring mounted means thereabout to cause upward movement of said pin, whereby the force thereof will urge said arbor upwardly when the previously mentioned ball means are removed from their position in the housing indentations.

References Cited in the file of this patent

UNITED STATES PATENTS

| | | |
|---|---|---|
| 1,124,981 | Weaver | Jan. 12, 1915 |
| 2,404,027 | Belanger | July 16, 1946 |
| 2,438,558 | Hollander | Mar. 30, 1948 |
| 2,620,689 | Cogsdill | Dec. 9, 1952 |